3,211,613
ANTICOCCIDIAL COMPOSITIONS AND METHOD OF USING SAME
Robert L. Clark, Woodbridge, and Edward F. Rogers, Middletown, N.J., asignors to Merck & Co., Inc., Rahway, N.J., a corporation of New Jersey
No Drawing. Filed Jan. 14, 1963, Ser. No. 251,011
6 Claims. (Cl. 167—53.1)

This invention relates to compositions and methods for treating and preventing a parasitic disease of animals. More specifically, it relates to compositions useful against the poultry disease coccidiosis, and with the method of using such compositions. Still more particularly, it is concerned with the treatment and prevention of coccidiosis with certain 2-alkoxy or 2-alkenyloxy benzaldehydes substituted at the 4-position. It is concerned further with poultry feeds, feed additives and feed supplements containing such substances as active anticoccidial agents.

Coccidiosis is a common and widespread poultry disease caused by species of protozoan parasites of the genus Eimeria. The more important of these species are *E. maxima, E. acervulina, E. tenella, E. necatrix, E. brunetti, E. praecox* and *E. mitis*. In turkeys, *E. meliadigris* and *E. adenoides* are also causative organisms of coccidiosis. When left untreated, the severe forms of the disease lead to poor weight gain, reduced feed efficiency and high mortality. For these reasons, the successful control of coccidiosis is highly important to the poultry industry.

Many of the coccidiostats heretofore available have been primarily effective against the *E. tenella* and *E. necatrix* species, and have had varying degrees of activity against other species such as *E. maxima, E. acervulina* and *E. brunetti*. We have now discovered a group of compounds that are primarily effective and useful in the treatment and prevention of coccidiosis due to these latter species. One object of the present invention, therefore, is to provide a new and important method of controlling coccidiosis. A further object is a method of controlling coccidial infections due to *E. maxima, E. acervulina* and *E. brunetti*. A further object is to provide poultry feeds containing at least one of the compounds described herein as an anticoccidial agent. A still further object is the provision of poultry feed supplement compositions containing such an anticoccidial agent. Other objects of the invention will become clear from the following description of the invention.

In accordance with our invention, it has now been discovered that 2-alkoxy or 2-alkenyl-4-substituted benzaldehydes of the structural formula

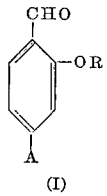

(I)

have a high degree of anticoccidial activity, particularly against *E. maxima, E. acervulina* and *E. brunetti*. In the above formula, A may be a nitro, amino, lower alkanoylamino or benzoylamino radical; R represents a lower alkyl or lower alkenyl group. Typical examples of substituents present at the 2-position of our compounds are methoxy, ethoxy, isopropoxy, propoxy, butoxy, allyloxy and methallyloxy radicals. Representative of the lower alkanoylamino groups that may be present at the 4-position of the benzaldehyde derivative are acetylamino, propionylamino and butyroylamino.

These substances, which may be described generally as 2-alkoxy or 2-alkenyloxy-4-substituted benzaldehydes, are highly useful in the prevention and control of coccidiosis when they are administered to poultry susceptible to or infected with coccidiosis, either by way of the drinking water or in the feed of the birds. Such compounds have a high degree of anticoccidial activity against the *E. maxima, E. brunetti* and *E. acervulina* species of coccidia so that administration of only minor amounts of the drug is necessary for adequate control of the disease.

The amount of compound required for optimal results in treating or preventing coccidiosis will vary to some extent depending on the type and severity of the coccidial infection, and on the particular compound which is used. As a general practice, the anticoccidial compounds of the present invention are administered to poultry in the feed at concentrations of about 0.0005% to 0.02% by weight of the feedstuff, and drug concentrations of 0.002% to 0.0125% by weight of feed are normally preferred. Levels of up to about 0.05% by weight of the feed may be used in treating an established outbreak of coccidiosis, although such higher dosages are not preferred for prophylactic treatment where a medicated feed is given continuously to the poultry. It will be appreciated by those skilled in this art that the lowest levels consonant with both adequate control of coccidiosis and the development of immunity are preferred in most instances in order to eliminate as far as possible any side effects that might result from prolonged feeding of unnecessarily high levels of these coccidiostats. The finished feed in which the above-described levels of coccidiostat are employed is a nutritionally adequate one containing sources of carbohydrate, protein, fat, vitamins, minerals and other nutritional factors commonly employed in commerical poultry raising.

In addition to administration by way of the solid feedstuff, the compounds of the invention may be given to poultry in the drinking water of the birds. The preferred dose levels in the drinking water are usually somewhat less than those employed in a solid feed since poultry drink about twice as much as they eat. Administration via the drinking water is of advantage when using the compounds therapeutically rather than prophylactically. For this purpose it is convenient to prepare dispersible or water-soluble powders in which the coccidiostat is intimately dispersed in a suitable water-soluble or dispersible carrier such as dextrose or sucrose at concentrations of from about 0.3% to about 25% by weight. These solids may then be conveniently added to the drinking water by the poultry grower.

According to a further aspect of this invention there are provided compositions comprising poultry feed supplements or additives containing a compound of Formula I above as an effective anticoccidial ingredient. In such compositions the anticoccidial compound is mixed with or dispersed in an orally ingestible carrier vehicle that is non-toxic to the poultry and compatible with the finished feedstuff, and that is preferably a nutritive carrier. These feed supplements contain a significantly higher percentage of coccidiostat drug than does the finished feed, and are mixed with or blended into the feedstuff before administration to the poultry. In order to assure uniform distribution of the coccidiostat in the finished feed, it is customary to employ an intermediate dilution step in which the supplement is blended with a portion of the final feed, and this "intermediate mix" is then added to the remainder of the feed with adequate mixing. The coccidiostat compounds described hereinabove may be formulated into feed supplement compositions containing from about 1.0% to about 30% by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 2.0% to about 30% by weight of active ingredient are preferred.

Nutritive diluents or carrier vehicles that may be used in making the poultry feed supplements of this invention are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Nutritive carriers are preferred since the finished feed is benefited thereby.

Examples of typical feed supplements containing a coccidiostat of the present invention are

|  | Lbs. |
|---|---|
| (1) 2-ethoxy-4-amino benzaldehyde | 2.0 |
| Amprolium | 25.0 |
| Wheat middlings | 73.0 |
| (2) 2-methoxy-4-acetylamino benzaldehyde | 4.0 |
| Corn distillers' grains | 96.0 |
| (3) 2-allyloxy-4-benzoylamino benzaldehyde | 10.0 |
| Corn germ meal | 40.0 |
| Corn distillers' grains | 50.0 |
| (4) 2-methoxy-4-nitro benzaldehyde | 15.0 |
| Wheat middlings | 85.0 |
| (5) 2-methoxy-4-amino benzaldehyde | 1.0 |
| 2-methyl-3,5-dinitro benzamide | 25.0 |
| Distillers' dried grains | 74.0 |

Representative examples of other 2-alkoxy or 2-alkenyloxy-4-substituted benzaldehydes which are within the purview of the invention and which are utilized as described herein for treatment of coccidiosis are 2-allyloxy-4-nitro benzaldehyde, 2-ethoxy-4-propionoylamino benzaldehyde, 2-isopropoxy-4-amino benzaldehyde and 2-butoxy-4-benzoylamino benzaldehyde. As will be recognized by those skilled in the chemical art, those compounds of the present invention which are basic in nature will form acid addition salts. In some cases such salts are preferred over the free base for use as coccidiostats, and such non-toxic acid addition salts are included within the purview of our invention. Among the most suitable acid addition salts are the mineral acid salts such as the hydrochlorides, hydrobromides, sulfates and the like.

The herein described compounds which have been found to be highly active coccidiostat compounds in accordance with this invention may be employed as the sole coccidiostat being administered to poultry, or they may be administered to poultry together with one or more other anticoccidial agents which are primarily active against *E. tenella* and *E. necatrix*. Examples of such other coccidiostats are amprolium, nicarbazin, glycarbylamide, 3,5-dinitrobenzamide and 2-methyl-3,5-dinitrobenzamide. Thus, one of the objects and achievements of this invention is the provision of highly active broad spectrum anticoccidial compositions which comprise a 2-alkoxy or 2-alkenyloxy-4-substituted benzaldehyde of structural Formula I, and at least one other anticoccidial agent that is highly active against *E. tenella* and *E. necatrix*. In many cases the efficacy of such a combination is greater than would be expected from the activity of either coccidiostat alone.

The preparation of many of the anticoccidial compounds of the present invention is described in the scientific literature since these substances have been made previously by others for different purposes. Those which are not specifically described in the literature are readily prepared from known chemicals by processes and methods familiar to those skilled in the chemical art.

The following examples are given for the purpose of illustration and not by way of limitation.

*Example 1*

Anticoccidial activity of the compounds of this invention was determined in the following manner:

Straight run White Leghorn chicks, in groups of three each, were weighed and placed in cages with wire floors. They were fed ad libitum a standard laboratory ration in which graded concentrations of test compounds were blended just prior to use. In addition to the groups receiving drug, normal and infected control birds were fed basal ration containing no test compound. On the second day of the test the chicks were inoculated orally with 100,000 sporulated oocysts of *Eimeria maxima*. On the sixth day after inoculation all surviving birds were sacrificed and weighed. The small intestines were pooled in water and homogenized in a blender. Two aliquots of the homogenate were examined for oocysts in a hemocytometer. If the total count of oocysts was less than 30, the compound was rated as active.

The activity of representative compounds of the invention is set forth below, the dose level being the minimum level at which the compound was active.

| Compound: | Dose level (percent by wt. in feed) |
|---|---|
| 2-methoxy-4-amino benzaldehyde | 0.001 |
| 2-methoxy-4-acetylamino benzaldehyde | 0.001 |
| 2-ethoxy-4-nitro benzaldehyde | 0.005 |

Any departure from the above description which conforms to the present invention is intended to be included within the scope of the claims.

What is claimed is:

1. An anticoccidial composition that comprises poultry feed having uniformly distributed therein from about 0.0005 to about 0.02% by weight of a compound having the formula

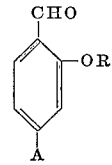

where R is selected from the class consisting of lower alkyl and lower alkenyl, and A is selected from the class consisting of nitro, amino, lower alkanoylamino and benzoylamino.

2. An anticoccidial composition that comprises a poultry feed having uniformly distributed therein from about 0.0005% to about 0.02% by weight of a member of the class consisting of 2-lower alkoxy-4-amino benzaldehyde and non-toxic acid addition salts thereof.

3. An anticoccidial composition that comprises a poultry feedstuff having dispersed therein from about 0.0005% to about 0.02% by weight of 2-alkoxy-4-lower alkanoylamino benzaldehyde.

4. An anticoccidial composition that comprises a poultry feedstuff having dispersed therein from about 0.0005% to about 0.02% by weight of 2-lower alkoxy-4-nitro benzaldehyde.

5. A poultry feed supplement composition that comprises a solid nutritive poultry feed additive having distributed therein from about 1–30% by weight of a compound of the formula

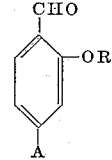

where R is selected from the class consisting of lower alkyl and lower alkenyl, and A is selected from the class consisting of nitro, amino, lower alkanoylamino and benzoylamino.

6. The method of controlling coccodiosis in poultry that comprises orally administering to poultry susceptible to coccidiosis infection an anticoccidial amount of a compound having the formula

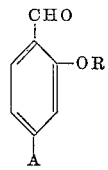

where R is selected from the class consisting of lower alkyl and lower alkenyl, and A is selected from the class consisting of nitro, amino, lower alkanoylamino and benzoylamino.

References Cited by the Examiner

Masukazu: Chem. Abst. vol. 46, 1952, page 4052C.
Tanaka: Chem. Abst. vol. 50, 1956, page 4834h.

JULIAN S. LEVITT, *Primary Examiner.*

FRANK CACCIAPAGLIA, JR., *Examiner.*